United States Patent
Moriguchi (10) Patent No.: US 10,793,754 B2
(45) Date of Patent: *Oct. 6, 2020

(54) HOT MELT ADHESIVE AND DISPOSABLE PRODUCT

(71) Applicant: HENKEL AG & CO. KGAA, Duesseldorf (DE)

(72) Inventor: Masahiro Moriguchi, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,888

(22) Filed: Aug. 14, 2017

(65) Prior Publication Data

US 2018/0016478 A1    Jan. 18, 2018

Related U.S. Application Data

(63) Continuation of application No. PCT/JP2016/000625, filed on Feb. 8, 2016.

(30) Foreign Application Priority Data

Feb. 20, 2015   (JP) .................. 2015-031547

(51) Int. Cl.
| | |
|---|---|
| A61F 13/15 | (2006.01) |
| C08L 51/06 | (2006.01) |
| C08L 53/02 | (2006.01) |
| C09J 151/06 | (2006.01) |
| C09J 153/02 | (2006.01) |
| C09J 123/16 | (2006.01) |
| C08K 5/092 | (2006.01) |
| C08K 5/1539 | (2006.01) |
| C08L 23/08 | (2006.01) |
| C09J 5/06 | (2006.01) |

(52) U.S. Cl.
CPC ............ *C09J 123/16* (2013.01); *C08K 5/092* (2013.01); *C08K 5/1539* (2013.01); *C08L 23/0815* (2013.01); *C08L 51/06* (2013.01); *C08L 53/02* (2013.01); *C09J 5/06* (2013.01); *C09J 151/06* (2013.01); *C09J 153/02* (2013.01); *C09J 2423/00* (2013.01); *C09J 2453/00* (2013.01)

(58) Field of Classification Search
CPC .... C08L 53/02; C08L 51/06; C08L 283/0815; C09J 123/16; C09J 151/06; C09J 153/02; C09J 5/06; C09J 2423/00; C09J 2453/00
See application file for complete search history.

(56) References Cited

U.S. PATENT DOCUMENTS

| | | | |
|---|---|---|---|
| 5,380,806 A | 1/1995 | Yano | |
| 5,849,809 A | 12/1998 | Narang et al. | |
| 5,948,527 A | 9/1999 | Gerard et al. | |
| 7,307,124 B2 * | 12/2007 | DuBois | A61L 15/585 525/98 |
| 9,765,245 B2 * | 9/2017 | Inoue | C09J 153/02 |
| 10,017,672 B2 * | 7/2018 | Moriguchi | A61L 15/585 |
| 10,138,400 B2 * | 11/2018 | Inoue | C09J 153/02 |
| 2008/0070053 A1 | 3/2008 | Schmierer | |
| 2008/0153971 A1 | 6/2008 | Salazar | |
| 2009/0110925 A1 | 4/2009 | Fukuda et al. | |
| 2011/0111243 A1 | 5/2011 | Laiho et al. | |
| 2011/0214284 A1 | 9/2011 | Xu et al. | |
| 2011/0263782 A1 | 10/2011 | Dubois | |
| 2013/0030096 A1 | 1/2013 | Lietzau | |
| 2013/0331528 A1 | 12/2013 | Carlborg et al. | |
| 2014/0199908 A1 | 7/2014 | Inoue | |
| 2016/0040047 A1 | 2/2016 | Inoue et al. | |

FOREIGN PATENT DOCUMENTS

| | | |
|---|---|---|
| CN | 101331203 A | 12/2008 |
| CN | 101547988 A | 9/2009 |
| CN | 102264854 A | 11/2011 |
| EP | 1564273 A1 | 8/2005 |
| EP | 1564275 A1 | 8/2005 |
| JP | 6210163 A | 1/1987 |
| JP | 2-232049 A | 9/1990 |
| JP | 5-311138 A | 11/1993 |
| JP | 05331355 A | 12/1993 |
| JP | 9-291265 A | 11/1997 |
| JP | 10-130349 A | 5/1998 |
| JP | 2000282006 A | 10/2000 |
| JP | 2000309767 A | 11/2000 |
| JP | 2004137297 A | 5/2004 |
| JP | 2004238548 A | 8/2004 |
| JP | 2006008947 A | 1/2006 |
| JP | 2007-169531 A | 7/2007 |
| JP | 2009511713 A | 3/2009 |
| JP | 2010506005 A | 2/2010 |
| JP | 2012021078 A | 2/2010 |
| JP | 2010536957 A | 12/2010 |

(Continued)

OTHER PUBLICATIONS

Licocene Performance Polymers Brochure published by Clariant (2013).*

*Primary Examiner* — Irina S Zemel
*Assistant Examiner* — Jeffrey S Lenihan
(74) *Attorney, Agent, or Firm* — Sue Hee Lehmann (57) ABSTRACT

Disclosed is a hot melt adhesive comprising: (A) a thermoplastic block copolymer which is a block copolymer of a vinyl-based aromatic hydrocarbon and a conjugated diene compound; and (B) an amorphous wax modified with a carboxylic acid and/or a carboxylic anhydride. The hot melt adhesive is excellent in applicability at a low temperature near from about 140° C. to about 150° C. and excellent in creep resistance in a wet state, can reduce odor, is excellent in initial adhesive force, and is excellent in adhesive property (peel strength) to an olefin substrate. This hot melt adhesive can be used suitably so as to produce a disposable product.

14 Claims, 1 Drawing Sheet

(56) References Cited

FOREIGN PATENT DOCUMENTS

| | | |
|---|---|---|
| JP | 5404958 B1 | 2/2014 |
| JP | 5539599 B | 7/2014 |
| JP | 2014-191039 A | 10/2014 |
| JP | 2014-227461 A | 12/2014 |
| WO | 9928405 A1 | 6/1999 |
| WO | 03027182 A1 | 4/2003 |
| WO | 2013039262 A1 | 3/2013 |
| WO | 2014034916 A1 | 3/2014 |
| WO | 2014051160 A1 | 4/2014 |
| WO | 2015046354 A1 | 4/2015 |

* cited by examiner

HOT MELT ADHESIVE AND DISPOSABLE PRODUCT

FIELD OF THE INVENTION

The present invention relates to a hot melt adhesive, and more particularly to a hot melt adhesive which is used in the field of disposable products typified by a paper diaper and a napkin.

BACKGROUND OF THE INVENTION

A hot melt adhesive is used for producing disposable products such as a diaper, a napkin and the like, and is applied to a base material thereof, for example, a nonwoven fabric, a tissue, a polyethylene film and the like. Examples of the hot melt adhesive mainly include synthetic rubber-based hot melt adhesives containing a thermoplastic block copolymer as a main component, and olefin-based hot melt adhesives represented by ethylene/propylene/butene copolymers. In recent years, use of the olefin-based hot melt adhesives decreases due to problems such as low applicability (or coatability), low cohesion and so on, and the synthetic rubber-based hot melt adhesives are broadly used because of their preferable applicability.

A diaper, a sanitary napkin and the like often have a structure in which an absorber constituted by a pulp, an absorbent polymer and the like is wrapped in a tissue, and the outside thereof is covered with a base material such as a nonwoven fabric, a polyethylene film and the like.

Generally, the synthetic rubber-based hot melt adhesives have low affinity to natural materials such as cellulose-based materials (for example, tissues, pulp and the like) and cotton materials, and when these materials are wet with body fluids, that is, in a wet state, the adhesive force thereof is remarkably lowered.

When the synthetic rubber-based hot melt adhesive is used so as to bond a tissue with a tissue or bond a tissue with a nonwoven fabric, body fluid absorbency of an absorbent article (or a disposable product) deteriorates in a wet state due to separation of the bonded portion between the tissues and between the tissue and the nonwoven fabric.

Therefore, various methods are reported so as to improve adhesive property of the synthetic rubber based hot melt adhesives (refer to Patent Literatures 1-3).

Patent Literature 1 discloses a hot melt adhesive comprising a styrene block copolymer and a wax modified with maleic acid (anhydride) (refer to [0063], [0066] [Table 1] of PTL 1). Since the wax modified with maleic acid (anhydride) is blended, the hot melt adhesive has more improved peel strength in a wet state. However, since the adhesive has a relatively high viscosity at a temperature of from 140 to 150° C., the adhesive has insufficient applicability at a low temperature.

Patent Literature 2 discloses a hot melt adhesive comprising a thermoplastic block copolymer and a liquid-like rubber having a carboxyl group and/or a carboxyl anhydride group in a molecule (refer to [0060]-[0064], [0074] [Table 1] of PTL 2). The applicability at a low temperature (140° C.-150° C.) of the hot melt adhesive of Patent Literature 2 is improved, but unpleasant odor may generate.

Patent Literature 3 discloses a hot melt adhesive comprising a thermoplastic block copolymer, an acid-modified petroleum resin, and a (not acid-modified) non-modified petroleum resin (refer to [claim 1], [0069]-[0071], [0088] [Table 1] of PTL 3). Since the hot melt adhesive of Patent Literature 3 comprises both of the acid-modified petroleum resin and the non-modified petroleum resin, the thermal stability of the adhesive is maintained and the adhesive property in a wet state of the adhesive is improved (refer to [0013], [0088] [Table 1] of PTL 3). However, the adhesive may have low adhesive property to a polyolefin film around body temperature (40° C.), low loop tackiness and insufficient initial adhesive force.

PATENT LITERATURE

[PTL 1] JP 2007-169531 A
[PTL 2] JP 5404958 B
[PTL 3] JP 5539599 B

SUMMARY OF THE INVENTION

Moreover, each of the hot melt adhesives of Patent Literatures 1-3 also has a problem that each of them has a low creep resistance in a wet state.

As described above, a disposable product such as a diaper, a sanitary napkin and the like has a structure in which an absorber constituted by a pulp, an absorbent polymer and the like is wrapped in a tissue and the outside thereof is covered with a base material such as a nonwoven fabric, a polyethylene film and the like. With regard to the disposable product bonded (formed or produced) with the synthetic rubber-based hot melt adhesive, a baby and an old person may put on a diaper or a napkin having an absorber which is wet and swelling with body fluid such as urine for a long time.

When the hot melt adhesive has a low creep resistance in a wet state, the absorber cannot maintain the shape (or form), the absorbable polymer and/or pulp in the absorber may be distorted and deformed, and their position may be inclined to one side. The deformation and the inclination of the position may induce leak of body fluid such as urine. Therefore, the creep resistance in a wet state as well as applicability at a low temperature, reduction of odor and adhesive property (or adhesive strength) is a very important property for the hot melt adhesive for disposable products.

An object of the present invention is to provide a hot melt adhesive which is excellent in applicability at a low temperature near from about 140° C. to about 150° C. and excellent in creep resistance in a wet state, can reduce odor, is excellent in initial adhesive force, and is excellent in adhesive property (peel strength) to an olefin base material.

The present inventors intensively studied, and found that blending a thermoplastic block copolymer (which is a copolymer of a vinyl-based aromatic hydrocarbon and a conjugated diene compound) with an amorphous wax modified with a carboxylic acid and/or a carboxylic anhydride provides a hot melt adhesive which is excellent in applicability at a low temperature near from about 140° C. to about 150° C. and excellent in creep resistance in a wet state, can reduce odor, is excellent in initial adhesive force, and is excellent in adhesive property (peel strength) to an olefin base material. Further, the present inventors found that such a hot melt adhesive is suitable for disposable products, and the present invention is completed.

That is, the present invention provides, in an aspect, a new hot melt adhesive which comprises:

(A) a thermoplastic block copolymer which is a block copolymer of a vinyl-based aromatic hydrocarbon with a conjugated diene compound; and (B) a wax modified with a carboxylic acid and/or a carboxylic anhydride.

The hot melt adhesive of an embodiment of the present invention is used suitably for the production of disposable products.

The present invention provides, in an embodiment, a hot melt adhesive, wherein (A) the thermoplastic block copolymer comprises a styrene block copolymer having styrene content of 10-50 wt %.

The present invention provides, in another embodiment, a hot melt adhesive, wherein (A) the thermoplastic block copolymer comprises a styrene-isoprene block copolymer.

The present invention provides, in a further embodiment, a hot melt adhesive, wherein (A) the thermoplastic block copolymer comprises a styrene-butadiene block copolymer.

The present invention provides, in a preferable embodiment, a hot melt adhesive, wherein (B) the amorphous wax modified with a carboxylic acid and/or a carboxylic anhydride comprises an amorphous polyolefin wax modified with maleic acid and/or maleic anhydride.

The present invention provides, in a further preferable embodiment, a hot melt adhesive, wherein the amorphous polyolefin wax modified with maleic acid and/or maleic anhydride comprises an amorphous ethylene/propylene copolymer wax.

The present invention provides, in further another embodiment, a hot melt adhesive, wherein the adhesive further comprises (C) a tackifier resin, and (C) the tackifier resin comprises a hydrogenated derivative.

The present invention provides, in further another embodiment, a hot melt adhesive, wherein the adhesive further comprises (D) a plasticizer, and (D) the plasticizer comprises paraffin oil.

The present invention provides, in further another preferable embodiment, a hot melt adhesive, wherein the adhesive has a melt viscosity not more than 5,000 mPa·s at a temperature of 150° C.

The present invention provides, in another aspect, a disposable product, wherein the disposable product is obtainable by applying any one of the above mentioned hot melt adhesives.

The hot melt adhesive of embodiments of the present invention comprises: (A) a thermoplastic block copolymer which is a block copolymer of a vinyl-based aromatic hydrocarbon and a conjugated diene compound; and (B) an amorphous wax modified with a carboxylic acid and/or a carboxylic anhydride. The hot melt adhesive has improved creep resistance in a wet state, is excellent in applicability at a low temperature and excellent in adhesive property, and can reduce odor. The hot melt adhesive of the present invention can be used suitably for the production of disposable products.

BRIEF DESCRIPTION OF THE FIGURES

The FIGURE provides a DSC chart indicating melting behaviors of an amorphous wax (B1) and a crystalline wax (B2') which are used in the Examples.

DETAILED DESCRIPTION OF THE INVENTION

Figure 1:
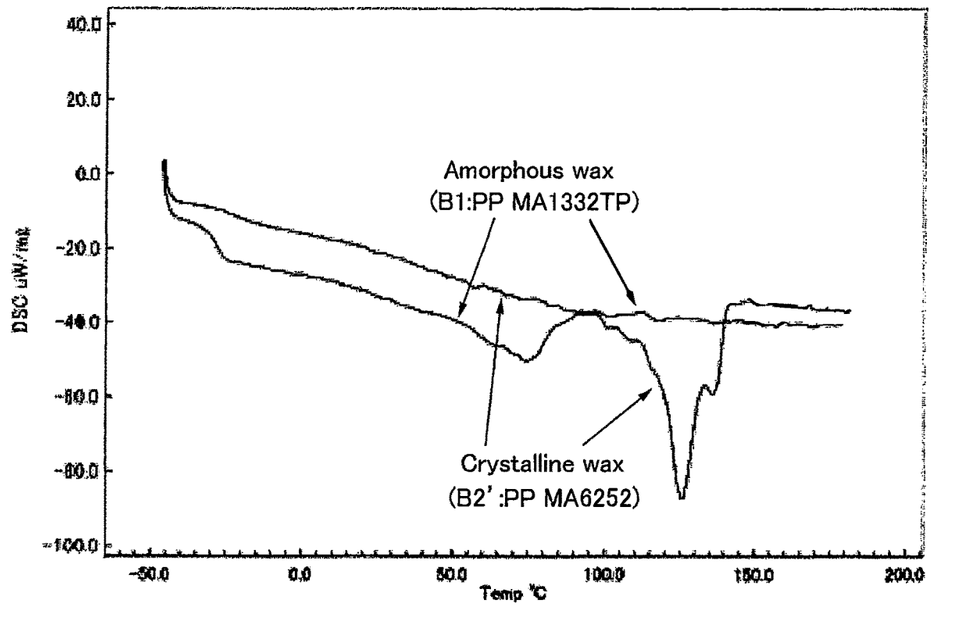

A hot melt adhesive of an embodiment of the present invention comprises two components as necessary components: (A) a thermoplastic block copolymer which is a block copolymer of a vinyl-based aromatic hydrocarbon with a conjugated diene compound (hereinafter, which is called "(A) block copolymer"); and (B) an amorphous wax modified with a carboxylic acid and/or a carboxylic anhydride (hereinafter, which is called "(B) amorphous wax").

In the present invention, the "(A) thermoplastic block copolymer" is a copolymer in which a vinyl-based aromatic hydrocarbon and a conjugated diene compound undergo block copolymerization, and is commonly a resin composition comprising a block copolymer having a vinyl-based aromatic hydrocarbon block and a conjugated diene compound block. There is no particular limitation as long as the objective hot melt adhesive of the present invention can be obtained.

As used herein, the "vinyl-based aromatic hydrocarbon" means an aromatic hydrocarbon compound having a vinyl group, and specific examples thereof include styrene, o-methylstyrene, p-methylstyrene, p-tert-butylstyrene, 2,4-dimethylstyrene, 3,5-dimethylstyrene, α-methylstyrene, vinylnaphthalene, vinylanthracene and the like. Styrene is particularly preferable. These vinyl-based aromatic hydrocarbons can be used alone, or in combination.

The "conjugated diene compound" means a diolefin compound having at least one pair of conjugated double bonds. Specific examples of the "conjugated diene compound" include 1,3-butadiene, 2-methyl-1,3-butadiene (or isoprene), 2,3-dimethyl-1,3-butadiene, 1,3-pentadiene and 1,3-hexadiene. Among these conjugated diene compounds, 1,3-butadiene and 2-methyl-1,3-butadiene are particularly preferable. These conjugated diene compound can be used alone, or in combination.

The thermoplastic block copolymer (A) according to the present invention may be either an unhydrogenated or hydrogenated thermoplastic block copolymer.

Specific examples of the "unhydrogenated thermoplastic block copolymer (A)" include block copolymers in which blocks based on the conjugated diene compound are not hydrogenated. Specific examples of the "hydrogenated thermoplastic block copolymer (A)" include block copolymers in which blocks derived from the conjugated diene compound are entirely or partially hydrogenated.

A proportion that the "hydrogenated thermoplastic block copolymer (A)" is hydrogenated can be indicated by a "hydrogenation ratio". The "hydrogenation ratio" of the "hydrogenated thermoplastic block copolymer (A)" refers to a proportion of double bonds converted into saturated hydrocarbon bonds by hydrogenation on the basis of all aliphatic double bonds included in the blocks based on the conjugated diene compound. The "hydrogenation ratio" can be measured by an infrared spectrophotometer, a nuclear magnetic resonance spectrometer and the like.

Specific examples of the "unhydrogenated thermoplastic block copolymer (A)" include a styrene-isoprene block copolymer (also referred to as "SIS") and a styrene-butadiene block copolymer (also referred to as "SBS"). Specific examples of the "hydrogenated thermoplastic block copolymer (A)" include a hydrogenated styrene-isoprene block copolymer (also referred to as "SEPS") and a hydrogenated styrene-butadiene block copolymer (also referred to as "SEBS").

These thermoplastic block copolymers (A) can be used alone, or in combination. The thermoplastic block copolymer (A) preferably comprises SIS. When the thermoplastic block copolymer (A) comprises SIS, the hot melt adhesive of the present invention is more excellent in creep resistance in a wet state.

The block copolymer (A) further preferably comprises SBS. The block copolymer (A) comprises both of SIS and SBS, the hot melt adhesive of an embodiment of the present invention is more excellent in balance of creep resistance in a wet state, applicability at a low temperature, adhesive property and reduction of odor.

The styrene content of the thermoplastic block copolymer (A) is preferably from 10 to 50% by weight, and more preferably from 15 to 45% by weight. The "styrene content" refers to the proportion of styrene block included in the (A) block copolymer.

When the hot melt adhesive of an embodiment of the present invention has a styrene content in the above mentioned range, the hot melt adhesive has further improved creep resistance in a wet state, and is more excellent in balance of applicability at a low temperature, adhesive property and reduction of odor.

In an embodiment of the present invention, the (A) block copolymer preferably has a di-block content of 80% by weight or less, and particularly preferably from 20 to 70% by weight. The di-block refers to a styrene-conjugated diene di-block copolymer represented by chemical formula (1), $$S\text{-}E: \qquad (1)$$

[wherein S refers to a styrene block, and E refers to a conjugated diene compound block.]

The "di-block content" means a proportion of the styrene-conjugated diene compound di-block copolymer represented by the chemical formula (1) included in the (A) block copolymer. When the block copolymer (A) has a di-block content in the above range, the hot melt adhesive of an embodiment of the present invention has improved creep resistance in a wet state, and is more excellent in balance of applicability at a low temperature, adhesive property and reduction of odor.

Moreover, in the present specification, a linear copolymer in which a styrene block is bonded with a conjugated di-block block and the di-block content is more than 0 wt % (that is, the copolymer comprises a di-block) means a linear type styrene block copolymer. On the other hand, a block copolymer having a di-block content of 0 wt % (that is, the copolymer comprising no di-block) may be a tri-block copolymer.

The block copolymer (A) preferably has a viscosity at 25° C. of 25 wt % toluene solution of from 100 to 800 mPa·s.

The "viscosity at 25° C. of 25 wt % toluene solution" means a viscosity measured at 25° C. of a solution having a concentration of 25 wt % in toluene as a solvent, and can be measured by means of, for example, a Brookfield BM type viscometer (spindle No. 2).

A hot melt adhesive of an embodiment of the present invention has a viscosity at 25° C. of 25 wt % toluene solution in the above mentioned range, the adhesive may has a lower melt viscosity and may be more easily applied at a low temperature.

It is possible to use, as the thermoplastic block copolymer (A), commercially available products.

Examples thereof include Asaprene T439 (trade name), Asaprene T436 (trade name), Asaprene T438 (trade name), Asaprene N505 (trade name), TAFTEC H1121 (trade name), TAFTEC H1062 (trade name), TAFTEC H1052X (trade name) and TUFPREN T125 (trade name) manufactured by Asahi Kasei Chemicals Corporation;

TR2000 (trade name), TR2003 (trade name), TR2500 (trade name) and TR2600 (trade name) manufactured by JSR Corporation;

Stereon 857 (trade name) and Stereon 841A (trade name) manufactured by Firestone;

Kraton D1118 (trade name), Kraton G1654 (trade name), Kraton G1726 (trade name) and Kraton D1162 (trade name) manufactured by Kraton Polymers;

Sol T166 (trade name) manufactured by Enichem;

Quintac 3433N (trade name), Quintac 3270 (trade name) and Quintac 3421 (trade name) manufactured by Zeon Corporation; and SEPTON 2002 and SEPTON 2063 (trade name) manufactured by Kuraray Co., Ltd; and Vector 4211 (trade name) manufactured by Dexco.

These commercially available products of the thermoplastic block copolymer (A) can be respectively used alone, or in combination.

The hot melt adhesive of an embodiment of the present invention comprises an amorphous wax modified with a carboxylic acid and/or a carboxylic anhydride.

In the present specification, a "crystalline wax" means a wax having a melting point, wherein a sharp and clear fusion peak is obtainable when the melting behavior of the wax is measured by DSC. On the other hand, an "amorphous wax" means a wax of which melting point cannot be measured easily since the fusion peak cannot be clearly observed by DSC.

The melting point refers to a value measured by differential scanning calorimetry (DSC).

Specifically, after weighing 10 mg of a sample in an aluminum container, the measurement is carried out using DSC6220 (trade name) manufactured by SIi NanoTechnology Inc as follows: the sample is cooled from 200° C. to −40° C. at a cooling rate of −5° C./min, maintained at −40° C. for 5 minutes and heated from −40° C. to 200° C. at a heating rate of 5° C./min, and a temperature of a peak top of an observed fusion peak refers to the melting point. With regard to a crystalline wax (B2': Licocene PP MA 6252 (trade name} manufactured by Clariant), a sharp and clear fusion peak was observed as represented in the FIGURE, but with regard to an amorphous wax (B1: Licocene PP MA 1332TP manufactured by Clariant), no clear fusion peak could be obverted. Furthermore, with regard to the (B2') plural peaks were observed. In such a case, the temperature of the peak top of the fusion peak observed at the most highest temperature is understood as a melting point. Further, a change of the DSC curve of (81) is understood as a change of the base line.

Since the amorphous wax (B) is blended, the hot melt adhesive of an embodiment of the present invention is excellent in creep resistance in a wet state. Since the creep resistance in a wet state is improved, an absorber is fixed in a diaper and/or a napkin without disalignment, and an absorbable polymer is maintained without positional inclination in the absorber. When the absorbable polymer is maintained without positional inclination, body fluid such as urine and the like does not leak from the diaper and the napkin.

There is no particular limitation on the amorphous wax (B) as long as it is modified with a carboxylic acid and/or a carboxylic anhydride, and the objective hot melt adhesive of the present invention can be obtained. Examples of the amorphous wax (B) include an amorphous wax which is obtainable by graft polymerization of a carboxylic acid or carboxylic anhydride with a base wax; and an amorphous wax which is obtainable by copolymerization of a carboxylic acid or a carboxylic anhydride on synthesizing the wax by polymerization. Therefore, the amorphous wax may also be modified and obtained as a result of the introduction of a carboxylic acid and/or a carboxylic anhydride using various reactions.

There is no particular limitation on the above "base wax" as long as it is a commonly usable wax for hot melt adhesives and the objective hot melt adhesive of the present invention can be obtained. Specific examples thereof include synthetic waxes such as a Fischer-Tropsch wax and a polyolefin wax (polyethylene wax, polypropylene wax and the like); petroleum waxes such as a paraffin wax and a microcrystalline wax; and natural waxes such as a castor wax.

There is no particular limitation on the carboxylic acid and/or carboxylic anhydride to be used to modify the base wax as long as the objective hot melt adhesive of an embodiment of the present invention can be obtained. Specific examples thereof include maleic acid, maleic anhydride, fumaric acid, succinic acid, succinic anhydride, phthalic acid, phthalic anhydride, glutaric acid, glutaric anhydride, itaconic acid, acrylic acid, methacrylic acid and the like. These carboxylic acids and/or carboxylic anhydrides may be used alone, or in combination. In the present invention, maleic acid and maleic anhydride are particularly preferable.

A material to modify the base wax may be various carboxylic acid derivatives as long as a polar group can be introduced. Herein, examples of the "carboxylic acid derivatives" include:

carboxylic acid esters such as ethyl acetate and vinyl acetate;
acid halides such as benzoyl bromide;
amides such as benzamide, N-methylacetamide and N,N-dimethylformamide;
imides such as succinimide;
acyl azides such as acetyl azide;
hydrazides such as propanoyl hydrazide;
hydroxamic acids such as chloroacetylhydroxamic acid;
lactones such as γ-butyrolactone; and
lactams such as δ-caprolactam.

In the present invention, the amorphous wax (B) has an acid value of preferably from 5 to 60 mgKOH/g, and more preferably from 10 to 40 mgKOH/g. The acid value can be measured in accordance with ASTM D1386 or BWM 3.01A.

The amorphous wax modified with a carboxylic acid and/or a carboxylic anhydride (B) of the present invention is preferably a polyolefin wax modified with maleic acid and/or maleic anhydride, and further particularly preferably an ethylene/propylene copolymer wax modified with maleic anhydride.

When the amorphous wax (B) comprises an ethylene/propylene copolymer wax, a hot melt adhesive of an embodiment of the present invention may have more improved creep resistance in a wet state, and leak of body fluid and leak of urine and the like from a diaper and a napkin etc. may be reduced.

It is possible to use, as the amorphous wax modified with a carboxylic acid and/or carboxylic anhydride (B), commercially available products. Examples of the wax (B) contain Licocene PP MA 1332TP (trade name) manufactured by Clariant and the like.

The amorphous wax (B) is not contained in (D) a plasticizer described below.

The hot melt adhesive of an embodiment of the present invention further comprises (C) a tackifier resin. The tackifier resin may be a substance usually used for hot melt adhesives and it is not particularly limited as long as it can give a hot melt adhesive intended by the present invention. The tackifier resin (C) preferably comprises a hydrogenated derivative. When the tackifier resin (C) comprises a hydrogenated derivative, the hot melt adhesive of an embodiment of the present invention may reduce an odor generated from disposable products.

Examples of the tackifier resin (C) include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a terpolymer of a natural terpene, hydrogenated derivatives of a copolymer of a hydrogenated terpene, a polyterpene resin, hydrogenated derivatives of a phenol-based modified terpene resin, an aliphatic petroleum hydrocarbon resin, hydrogenated derivatives of an aliphatic petroleum hydrocarbon resin, an aromatic petroleum hydrocarbon resin, hydrogenated derivatives of an aromatic petroleum hydrocarbon resin, a cyclic aliphatic petroleum hydrocarbon resin, and hydrogenated derivatives of a cyclic aliphatic petroleum hydrocarbon resin. These tackifier resins can be used alone, or in combination. It is also possible to use, as the tackifier resin, a liquid type tackifier resin as long as it has a colorless to pale yellow color tone and substantially no odor, and also has satisfactory thermal stability.

It is possible to use, as the tackifier resin (C), commercially available products. Examples of these commercially available products include MARUKACLEAR H (trade name) manufactured by Maruzen Petrochemical CO, LTD.; Alcon M100 (trade name) manufactured by Arakawa Chemical Industries, Ltd.; I-MARV S100 (trade name) and I-MARV P125 (trade name) manufactured by Idemitsu Kosan Co., Ltd.; Clearon K100 (trade name), Clearon K4090 (trade name) and Clearon K4100 (trade name) manufactured by YASUHARA CHEMICAL CO., LTD.; ECR179EX (trade name) and ECR231C (trade name) manufactured by ExxonMorbil Corporation; Rigarite C6100L (trade name) and Rigarite C8010 (trade name) manufactured by Eastman Chemical Company; and FTR2140 (trade name) manufactured by Mitsui Chemicals, Inc. Moreover, examples of non-hydrogenated tackifier resins include Quinton DX395 (trade name) and Quinton DX390N (trade name) manufactured by Zeon Corporation; and CX495 (trade name) manufactured by Zeon Corporation. These commercially available tackifier resins can be used alone, or in combination.

The hot melt adhesive of the present invention can further comprise (D) a plasticizer. The plasticizer (D) is blended for the purpose of decrease in melt viscosity of the hot melt adhesive, imparting flexibility to the hot melt adhesive, and an improvement in wettability of the hot melt adhesive to an adherend. The plasticizer (D) is not particularly limited as long as it is compatible with the block copolymer (A) and the hot melt adhesive of an embodiment of the present invention can be obtained. Examples of the plasticizer (D) include a paraffin-based oil, a naphthene-based oil, an aromatic-based oil and the like. Considering the reduction of odor which is one of the problems of the present invention, the colorless and odorless paraffin-based oil is the most preferable.

It is possible to use, as the plasticizer (D), commercially available products. Examples thereof include White Oil Broom 350 (trade name) manufactured by Kukdong Oil & Chemical Co., Ltd.; Diana Fresia S32 (trade name), Diana Process Oil PW-90 (trade name) and Daphne Oil KP-68 (trade name) manufactured by Idemitsu Kosan Co., Ltd.; Enerper M1930 (trade name) manufactured by BP Chemicals Ltd.; Kaydol (trade name) manufactured by Crompton Corporation; Primol 352 (trade name) manufactured by Esso Corporation; and Sun Pure N-90 (trade name) manufactured by Sun Oil Company Ltd. These plasticizers (D) can be used alone, or in combination.

If necessary, the hot melt adhesive of an embodiment of the present invention may further contain various additives. Examples of the various additives include a stabilizer and a fine particle filler.

The "stabilizer" is blended so as to improve stability of the hot melt adhesive by preventing decrease in molecular weight, gelation, coloration, and generation of odor of the hot melt adhesive due to heat, and there is no particular limitation on the stabilizer as long as the objective hot melt adhesive of an embodiment of the present invention can be obtained. Examples of the "stabilizer" include an antioxidant and an ultraviolet absorber.

The "ultraviolet absorber" is used so as to improve light resistance of the hot melt adhesive. The "antioxidant" is used so as to prevent oxidation degradation of the hot melt adhesive. The antioxidant and ultraviolet absorber are commonly used in disposable products and can be used without particular limitation as long as the below-mentioned objective disposable products can be obtained.

Examples of the antioxidant include a phenol-based antioxidant, a sulfur-based antioxidant and a phosphorus-based antioxidant. Examples of the ultraviolet absorber include a benzotriazole-based ultraviolet absorber and a benzophenone-based ultraviolet absorber. It is also possible to add a lactone-based stabilizer. These additives can be used alone, or in combination.

It is possible to use, as the stabilizer, commercially available products. Examples thereof include SUMILIZER GM (trade name), SUMILIZER TPD (trade name) and SUMILIZER TPS (trade name) manufactured by Sumitomo Chemical Co. Ltd.; IRGANOX 1010 (trade name), IRGANOX HP2225FF (trade name), IRGAFOS 168 (trade name) and IRGANOX 1520 (trade name) manufactured by BASF; and JF77 (trade name) manufactured by Johoku Chemical Co., Ltd. These stabilizers can be used alone, or in combination.

The hot melt adhesive of an embodiment of the present invention can further include a fine particle filler. Commonly used fine particle filler may be used, and there is no particular limitation as long as the hot melt adhesive of an embodiment of the present invention can be obtained. Examples of the "fine particle filler" include mica, calcium carbonate, kaolin, talc, titanium oxide, diatomaceous earth, urea-based resin, styrene beads, calcined clay, starch and the like. These particles preferably have a spherical shape, and there is no particular limitation on the size (diameter in case of a spherical shape).

Considering blending the block copolymer (A) with the amorphous wax (B) in the present invention, the amorphous wax (B) is preferably comprised in an amount of from 1 to 15 parts by weight, most preferably comprised in an amount of from 2 to 7 parts by weight on the basis of 100 parts by weight of the total weight of the thermoplastic block copolymer (A) and the amorphous wax (B). When the block copolymer (A) and the amorphous wax (B) are blended in the above mentioned range, the hot melt adhesive of an embodiment of the present invention may have improved creep resistance in a wet state, while maintaining adhesive strength to an olefin base material.

The hot melt adhesive of an embodiment of the present invention comprises the thermoplastic block copolymer (A) and the amorphous wax (B), and further preferably comprises the tackifier resin (C) and/or the plasticizer (D).

The tackifier resin (C) is preferably blended in an amount of from 200 to 300 parts by weight, particularly preferably blended in an amount of from 220 to 260 parts by weight on the basis of 100 parts by weight of the total weight of the thermoplastic block copolymer (A) and the amorphous wax (B) to the hot melt adhesive of an embodiment of the present invention. When the tackifier resin (C) is blended in an amount of the above mentioned range, the hot melt adhesive of an embodiment of the present invention may also be excellent in applicability at a low temperature while maintaining adhesive strength to an olefin base material.

In the hot melt adhesive of the present invention, the blending amount of the plasticizer (D) is preferably from 50 to 80 parts by weight, and more preferably from 60 to 75 parts by weight, based on 100 parts by weight of the total weight of the thermoplastic block copolymer (A) and the amorphous wax (B). When the plasticizer (D) is blended in an amount of the above mentioned range, the hot melt adhesive of an embodiment of the present invention may be excellent in applicability at a low temperature since the adhesive has a lowered melt viscosity, flexibility is imparted to the adhesive, and the adhesive has improved wettability to an adherend.

The hot melt adhesive of an embodiment of the present invention can be produced by blending the component (A) and the component (B), blending optionally the components (C) and/or the component (D), if necessary adding the various additives, and melting the mixture with heating, followed by mixing. Moreover, when the components (C) and (D) are blended, the components (A), (B), (C) and (D) are blended in the above range, and similarly the adhesive may be preferably produced. Specifically, the hot melt adhesive can be produced by charging the above components in a melt-mixing vessel equipped with a stirrer, followed by heating and mixing.

Since the hot melt adhesive of the present invention may have a low melt viscosity at 150° C. of 5,000 mPa·s or less and a low melt viscosity at 140° C. of 8,000 mPa·s or less, the adhesive may be applied at a low temperature (from 140° C. to 150° C.) and may be applied with omega coating which will be described below. Hot melt adhesives which can be applied with the omega coating at a low temperature are suitable for producing disposable products.

The hot melt adhesive of an embodiment of the present invention can be widely used for paper processing, bookbinding, disposable products and so on, and the adhesive can be used particularly suitably for disposable products since it is excellent in creep resistance in a wet state. There is no particular limitation on the disposable products as long as they are so-called sanitary materials. Specific examples thereof include a paper diaper, a sanitary napkin, a pet sheet, a hospital gown, a surgical white garment and the like.

The present invention provides, in another aspect, disposable products obtainable by applying the above hot melt adhesive. The disposable products can be prepared by applying the hot melt adhesive of an embodiment of the present invention to at least one kind of member selected from a group consisting of a woven fabric, a nonwoven fabric, a rubber, a resin, papers and a polyolefin film. The polyolefin film is preferably a polyethylene film due to the reason of durability, costs and the like.

In the production line of the disposable products, various members (for example, tissue, cotton, nonwoven fabric, polyolefin film, etc.) of the disposable products are commonly coated with a hot melt adhesive. In case of coating, the hot melt adhesive may be discharged (or ejected) from various dischargers (or ejectors).

There is no particular limitation on the method of applying the hot melt adhesive as long as the objective disposable products of an embodiment of the present invention can be obtained. Such a coating method is roughly classified into a contact coating method and a non-contact coating method. The "contact coating" method refers to a coating method in which a discharger is brought into contact with a member or a film in coating with the hot melt adhesive, while the "non-contact coating" method refers to a coating method in which a discharger is not brought into contact with a member or a film in coating with the hot melt adhesive. Examples of the contact coating method include a slot coater coating method, a roll coater coating method and the like, and examples of the non-contact coating method include a spiral coating capable of coating in a spiral form, an omega coating or control seam coating method capable of coating in a wavy form, a slot spray coating or curtain spray coating method capable of coating in a plane form, and dot coating capable of coating in a dot form.

The omega coating (or application) with the hot melt adhesive of an embodiment of the present invention can be carried out at a low temperature (150° C. or less).

The omega coating is one of the non-contact coating method, in which an adhesive is intermittently or continuously applied widely in a wavy form using a spray with air. It is extremely useful for the production of the disposable products that the hot melt adhesive can be applied widely. The width coated with the adhesive can be narrowed by adjusting the hot air pressure of the spray.

A hot melt adhesive which cannot be applied widely needs many spray nozzles so as to obtain a wide bonding area (or adhesive area) when applying the adhesive. It is necessary to apply the hot melt adhesive widely with the omega coating so as to decrease the number of the spray nozzles in preparing relatively small disposable products such as urine liner (or urine absorbing liner) and disposable products having complicated shape.

Generally, adhesives used in the omega coating have a melt viscosity of 5,000 mPa·s or less. Common hot melt adhesives have a melt viscosity at 150° C. of more than 5,000 mPa·s. Therefore, the coating temperature in the omega coating should be adjusted to a high temperature of 160° C. or more so as to decrease the melt viscosity of the hot melt adhesives to 5,000 mPa·s or less. However, if the hot melt adhesive is applied at a temperature of 160° C. or more, since a polyethylene film as a base material of the disposable products melts and shrinks thermally, the appearance of the disposable products is drastically impaired.

As described above, the hot melt adhesive of an embodiment of the invention may have a melt viscosity at 150° C. of 5,000 mPa·s or less, and can be applied at 150° C. with the omega coating. Since the coating temperature may be 150° C., even though the hot melt adhesive of an embodiment of the present invention is applied with the omega coating, the appearance of a polyethylene film and a nonwoven fabric does not change. Therefore, the hot melt adhesive of an embodiment of the present invention is suitable so as to prepare the disposable products.

EXAMPLES

The present invention will be described in a detailed and specific manner by way of Examples and Comparative examples, but these Examples are merely an embodiment of the present invention and the present invention should in no way be limited to these Examples. Moreover, in the examples, portions without a solvent are basis of parts by weight and weight % as long as there is no particular recitation.

Components used in Examples are shown below.

(A) Thermoplastic Block Copolymer (A1) Tri-block type styrene-isoprene block copolymer (Kraton D1162 (trade name) manufactured by Kraton Polymers), styrene content: 44 wt %, di-block content: 0 wt %, viscosity at 25° C. of 25 wt % toluene solution (TV): 120 mPa·s)

(A2) Tri-block type styrene-isoprene block copolymer (Vector 4211A (trade name) manufactured by Dexco), styrene content: 30 wt %, di-block content: 0 wt %, TV: 300 mPa·s)

(A3) Linear type styrene-isoprene block copolymer (Quintac 3433N (trade name) manufactured by Zeon Corporation), styrene content: 16 wt %, di-block content: 56 wt %, TV: 810 mPa·s)

(A4) Linear type styrene-isoprene block copolymer (Quintac 3270 (trade name) manufactured by Zeon Corporation), styrene content: 24 wt %, di-block content: 67 wt %, TV: 20 mPa·s)

(A5) Tri-block type styrene-isoprene block copolymer (TR2000 (trade name), manufactured by JSR Corporation), styrene content: 40 wt %, di-block content: 0 wt %, TV: 95 mPa·s)

(A6) Linear type styrene-isoprene block copolymer (Asaprene T438 (trade name), manufactured by Asahi Kasei Chemicals Corporation), styrene content: 38 wt %, di-block content: 70 wt %, TV: 360 mPa·s)

(A7) Linear type styrene-isoprene block copolymer (Asaprene T439 (trade name), manufactured by Asahi Kasei Chemicals Corporation), styrene content: 43 wt %, di-block content: 60 wt %, TV: 170 mPa·s)

(B) Amorphous Wax Modified with a Carboxylic Acid and/or a Carboxylic Anhydride (B1) Amorphous maleic anhydride-modified ethylene/propylene copolymer wax (Licocene PP MA 1332TP (trade name) manufactured by Clariant), acid value: 18 mgKOH/g)

(B2') Crystalline maleic anhydride-modified polypropylene wax (Licocene PP MA 6252 (trade name) manufactured by Clariant), melting point: 140° C., acid value: 40 mgKOH/g)

(B3') Crystalline maleic anhydride-modified polyethylene wax (HI-WAX (trade name) manufactured by Mitsui Chemicals, Inc.), melting point: 104° C., acid value: 60 mgKOH/g)

(B4') Crystalline carboxylic acid-modified polyethylene wax (EXCEREX 15341 PA (trade name) manufactured by Mitsui Chemicals, Inc.), melting point: 89° C., acid value: 14 mgKOH/g)

(B5') Crystalline ethylene/vinylacetate copolymer wax (A-C 400 (trade name) manufactured by Honeywell), vinylacetate content: 13%, melting point: 92° C.)

(C) Tackifier Resin (C1) Hydrogenated tackifier resin (hydrogenated derivative) (ECR179EX (trade name) manufactured by Exxon Mobil Corporation), softening point: 100° C.)

(C2) Hydrogenated tackifier resin (hydrogenated derivative) (AlconM100 (trade name) manufactured by Arakawa Chemical Industries, Ltd., softening point: 100° C.)

(C3) Hydrogenated tackifier resin (hydrogenated derivative) (I-MARV S100 (trade name) manufactured by Idemitsu Kosan Co., Ltd., softening point: 100° C.)

(C4) Hydrogenated tackifier resin (hydrogenated derivative) (I-MARV P125 (trade name) manufactured by Idemitsu Kosan Co., Ltd., softening point: 100° C.)

(C5) Maleic acid-modified tackifier resin (CX495 (trade name) manufactured by Zeon Corporation, acid value: 1.8 mgKOH/g)

(C6) Terpene based tackifier resin (Clearon K4100 (trade name) manufactured by YASUHARA CHEMICAL CO., LTD., softening point: 100° C.)

(D) Plasticizer (D1) Paraffin oil (Diana Fresia S32 (trade name), manufactured by Idemitsu Kosan Co., Ltd.)

(D2) Naphthene oil (Sun Pure N-90 (trade name) manufactured by Sun Oil Company Ltd.)

(D3) Paraffin oil (Daphne Oil KP-68 (trade name) manufactured by Idemitsu Kosan Co., Ltd.)

(D4) Paraffin oil (Diana Process Oil PW90 (trade name), manufactured by Idemitsu Kosan Co., Ltd.)

(E) Stabilizer (E1) Phenol-based primary antioxidant (SUMILIZER GM (trade name) manufactured by Sumitomo Chemical Co. Ltd.)

(E2) Sulfur-based secondary antioxidant (SUMILIZER TPD (trade name) manufactured by Sumitomo Chemical Co. Ltd.)

(E3) Ultraviolet absorber (JF77 (trade name) manufactured by Johoku Chemical Co., Ltd.)

(E4) Phenol-based primary antioxidant (IRGANOX 1010 (trade name) manufactured by BASF)

(F) Liquid-Like Rubber Having a Carboxyl Group (F1) Liquid-like polyisoprene having a carboxyl group (LIR-410 (trade name) manufactured by Kuraray Co., Ltd.)

These components were blended (or formulated) according to compositions shown in Tables 1 and 2, and then melt-mixed at about 150° C. over about 3 hours using a universal stirrer to prepare hot melt adhesives of Examples 1 to 5 and Comparative examples 1 to 8.

With regard to each of the above mentioned hot melt adhesives, melt viscosity (applicability or coatability), applicability in omega coating (or with omega coating), creep resistance in a wet state, odor, loop tackiness (initial adhesive force) and peel strength (regarding a polyethylene film) are measured and evaluated. The evaluation results are shown in Tables 1 and 2.

<Melt Viscosity (Evaluation of Applicability)>

Melt viscosity is measured by heating and melting each of the hot melt adhesives and using a Brookfield RVT-type viscometer (spindle No. 27) and a thermo-cell to obtain a viscosity in a melted state at each of 140° C. and 150° C. Applicability at each temperature is evaluated using each value of the viscosity. The evaluation criteria are as follows.

Melt Temperature: 140° C. (Applicability at 140° C.)
A: less than 5,000 mPa·s
B: 5,000 mPa·s or more and 8,000 mPa·s or less
C: more than 8,000 mPa·s Melt Temperature: 150° C. (Applicability at 150° C.)
A: less than 3,500 mPa·s
B: 3,500 mPa·s or more and 5,000 mPa·s or less
C: more than 5,000 mPa·s <Applicability in Omega Coating>

Each of the hot melt adhesives was applied to a 12 μm thick polyethylene terephthalate (PET) film with an omega spray (or a spray for omega coating) at a temperature of 150° C. to evaluate applicability.

The omega spray (produced by ITW Dynateck K.K.) was positioned at a height of 30 cm from the PET film. Omega coating was carried out under the condition of a discharge rate of 20 g/min, an air pressure of 0.4 kgf/cm$^2$ and a line speed of PET film of 250 m/min to evaluate applicability in omega coating in view of coating width of the hot melt adhesive.

A: Coating width was 5 mm or more and 7 mm or less.

B: Coating width was more than 7 mm and less than 9 mm, or more than 3 mm and less than 5 mm.

C: Coating width was 3 mm or less, or 9 mm or more.

<Creep Resistance in a Wet State>

Each of the hot melt adhesives was applied to a 12 μm thick PET film with an omega spray, and the PET film was bonded with a tissue to prepare a sample. The coating temperature was 150° C., the coating weight (or amount) was 5 g/min, and the open time was 0.15 sec.

The sample was cut into 50 mm in width, and a portion coated with the hot melt adhesive was soaked with water, and then a 500 g of weight was hung downwardly from the adhesive surface to be left to stand at 35° C. Dropping time of the weight (or a time needed by dropping of the weight) was measured to evaluate creep resistance in a wet state. Evaluation criteria are described below.

A: Dropping time is more than 100 sec.

B: Dropping time is from 85 to 100 sec.

C: Dropping time is less than 85 sec.

<Odor>

In a 70 ml of glass bottle, each of the hot melt adhesives was charged in an amount of 30 g. An aluminum foil as a lid was put on the glass bottle. The hot melt adhesive was melted and left to stand under an atmosphere at 160° C. for 1 day, and was cooled to a normal temperature. The aluminum foil lid was removed, and then odor of the hot melt adhesive was judged by sensory evaluation. Evaluation criteria are described below.

A: Odor is scarcely recognized.

B: Unpleasant odor is slightly recognized.

C: Unpleasant odor is clearly recognized.

<Loop Tackiness (Initial Adhesive Force)>

Each of the hot melt adhesive was applied to a 50 μm thick PET film, so that the hot melt adhesive had a thickness of 50 μm. This PET film was cut into 25 mm×100 mm in size to prepare a sample. This sample was wound in a loop shape so that the adhesive surface (the surface coated with the adhesive) became outside, and was contacted with a PE plate at a rate of 300 mm/min at 20° C. Then, the test piece was peeled off the PE plate at a peeling rate of 300 mm/min to measure the peeling strength, which was referred to loop tackiness. Evaluation criteria are described below.

A: Loop tackiness was more than 2400 (g/25 mm).

B: Loop tackiness is from 2200 to 2400 (g/25 mm).

C: Loop tackiness is less than 2200 (g/25 mm).

<Peel Strength>

Each of the hot melt adhesive was applied to a 50 μm thick PET film, so that the hot melt adhesive had a thickness of 50 μm. This was cut into 25 mm in width to prepare a sample. The sample was bonded with a 100 μm thick polyethylene film at 20° C. In the bonding, a 2 kg of roller was contacted with the PET film at a rate of 5 mm/sec. After the sample was left to stand for a day at 20° C., a peel test was performed at a peeling rate of 300 mm/minute at 40° C. to measure the peel strength. Evaluation criteria are described below.

A: Peel strength was more than 1400 (g/25 mm).

B: Peel strength is from 1200 to 1400 (g/25 mm)

C: Peel strength is less than 1200 (g/25 mm)

TABLE 1

|   |   | Example |   |   |   |   |
|---|---|---|---|---|---|---|
|   |   | 1 | 2 | 3 | 4 | 5 |
| (A) | (A1) | 26 |   |   |   | 11.5 |
|   | (A2) |   |   |   | 16 |   |
|   | (A3) |   |   | 57 |   | 19 |
|   | (A4) |   | 24 |   |   |   |
|   | (A5) |   |   |   |   |   |
|   | (A6) | 43 | 41 | 39 | 62 | 58 |
|   | (A7) | 26 | 29 |   | 19 |   |
| (B) | (B1) | 5 | 6 | 4 | 3 | 11.5 |
| (B') | (B2') |   |   |   |   |   |
|   | (B3') |   |   |   |   |   |
|   | (B4') |   |   |   |   |   |
|   | (B5') |   |   |   |   |   |
| (C) | (C1) | 192 | 238 | 128 |   | 165 |
|   | (C2) |   |   | 117 | 109 |   |
|   | (C3) | 65 |   |   | 114 | 60 |
|   | (C4) |   |   |   |   |   |
|   | (C5) |   |   |   |   |   |
|   | (C6) |   |   |   |   |   |
| (D) | (D1) | 24 | 22 | 68 | 62 | 58 |
|   | (D2) | 48 | 45 |   |   |   |
|   | (D3) |   |   |   |   |   |
|   | (D4) |   |   |   |   |   |
| (E) | (E1) | 1 | 1 |   | 1 | 1 |
|   | (E2) | 1.5 | 1.5 |   | 1.5 | 1.5 |
|   | (E3) | 1 | 1 |   | 1 |   |
|   | (E4) |   |   | 5 |   |   |
| (F) | (F1) |   |   |   |   |   |
|   | Total | 432.5 | 408.5 | 418 | 388.5 | 385.5 |
| Melt viscosity | 140° C. (mPa·s) | 4590 | 4910 | 6800 | 5350 | 6440 |
|   |   | A | A | B | B | B |
|   | 150° C. (mPa·s) | 2950 | 3170 | 4430 | 3480 | 4050 |
|   |   | A | A | B | A | B |
| Applicability in omega coating | Temperature 150° C. | A | A | A | A | A |
| Creep resistance in a wet state | (sec) PET vs Tissue | 133 A | 131 A | 142 A | 114 A | 120 A |
| Odor | 160° C., after one day | A | A | A | A | A |
| Loop tackiness | (g/25 mm) | 2890 A | 3125 A | 2900 A | 2450 A | 2780 A |
| Peel strength PET vs PE | (g/25 mm) | 1410 A | 1470 A | 1520 A | 1460 A | 1560 A |

TABLE 2

|   |   | Comparative Examples |   |   |   |   |   |   |   |
|---|---|---|---|---|---|---|---|---|---|
|   |   | 1 | 2 | 3 | 4 | 5 | 6 | 7 | 8 |
| (A) | (A1) |   |   |   |   |   |   |   |   |
|   | (A2) |   |   |   |   |   |   |   |   |
|   | (A3) | 100 | 18.5 |   |   | 26.5 | 26.5 | 62.5 | 100 |
|   | (A4) |   |   | 26 | 26 |   |   |   |   |
|   | (A5) |   |   |   |   | 31.5 | 31.5 |   |   |
|   | (A6) |   |   | 43.5 | 22 | 42 | 42 | 37.5 |   |
|   | (A7) |   | 30.5 | 52 |   |   |   |   |   |
| (B) | (B1) |   |   |   |   |   |   |   |   |
| (B') | (B2') |   |   |   |   |   |   | 6 |   |
|   | (B3') |   |   |   |   | 8 |   |   |   |
|   | (B4') |   |   |   |   |   | 10.5 |   |   |
|   | (B5') |   | 20 |   |   |   |   |   |   |
| (C) | (C1) |   |   | 255 | 255 | 232 | 229 |   |   |
|   | (C2) |   | 226 |   |   |   |   |   | 300 |
|   | (C3) |   |   |   |   | 84 | 84 |   |   |
|   | (C4) | 226 |   |   |   |   |   |   |   |
|   | (C5) | 79 | 79 |   |   |   |   |   |   |
|   | (C6) |   |   |   |   |   |   | 237 |   |
| (D) | (D1) |   |   | 24 | 48 | 100 | 100 | 71 |   |
|   | (D2) |   |   | 48 | 24 |   |   |   |   |
|   | (D3) | 105 | 105 |   |   |   |   |   |   |
|   | (D4) |   |   |   |   |   |   |   | 100 |
| (E) | (E1) |   |   | 1 | 1 | 1 | 1 | 1 |   |
|   | (E2) |   |   | 1.5 | 1.5 | 1.5 | 1.5 | 1.5 |   |
|   | (E3) |   |   | 1 | 1 |   |   |   |   |
|   | (E4) | 10 | 10 |   |   |   |   |   | 5 |
| (F) | (F1) |   |   |   |   |   |   |   | 2.5 |
|   | Total | 520 | 540 | 430.5 | 430.5 | 526.5 | 526 | 416.5 | 507.5 |
| Melt viscosity | 140° C. (mPa·s) | 8670 C | 3900 A | 4760 A | 3960 A | 3100 A | 3000 A | 8100 C | 5400 B |
|   | 150° C. (mPa·s) | 4400 B | 2500 A | 3050 A | 2550 A | 2100 A | 2000 A | 5450 C | 3500 B |
| Applicability in omega coating | Temperature 150° C. | B | A | A | A | A | A | C | B |
| Creep resistance in a wet state | (sec) PET vs Tissue | 69 C | 82 C | 39 C | 42 C | 78 C | 82 C | 78 C | 62 C |
| Odor | 160° C., after one day | B | C | A | B | B | B | B | C |
| Loop tackiness | (g/25 mm) | 2190 C | 2390 B | 3270 A | 3060 A | 2420 A | 2590 A | 2270 B | 2810 A |
| Peel strength PET vs PE | (g/25 mm) | 1240 B | 1040 C | 1290 B | 1330 B | 1500 A | 1490 A | 1690 A | 1210 B |

As indicated in Table 1, the hot melt adhesives of Examples 1-5 are excellent in creep resistance in a wet state. Moreover, they have satisfactory melt viscosity (applicability at a low temperature), applicability in omega coating, odor (low odor) and peel strength (in view of a polyethylene film), and is also excellent in balance of the mentioned properties.

In contrast, the hot melt adhesives of Comparative examples 1 to 8 indicated in Table 2 are inferior in creep resistance in a wet state.

The hot melt adhesives of Comparative examples 1 and 2 are corresponding to the invention of Patent Literature 3, and both of them are inferior in creep resistance in a wet state. Moreover, the hot melt adhesive of Comparative example 1 has a low applicability at 140° C. and a low loop tackiness (initial adhesive force), and the hot melt adhesive Comparative example 2 cannot prevent generation of odor.

The hot melt adhesive of Comparative example 7 is corresponding to the invention of Patent Literature 1, and is insufficient in both of applicability and creep resistance in a wet state.

The hot melt adhesive of Comparative example 8 is corresponding to the invention of Patent Literature 2, is inferior in creep resistance in a wet state, and cannot prevent generation of odor.

According to these results, it is demonstrated that when a hot melt adhesive comprises both of a "thermoplastic block copolymer which is a block copolymer of a vinyl-based aromatic hydrocarbon with a conjugated diene compound" and an "amorphous wax modified with a carboxylic acid and/or a carboxyl anhydride", the adhesive is excellent in balance of creep resistance in a wet state, applicability at a low temperature, adhesive property (peel strength), initial adhesive force and reduction of odor.

INDUSTRIAL APPLICABILITY

The present invention provides a hot melt adhesive and a disposable product obtainable by applying the hot melt adhesive. Since the hot melt adhesive of the present invention is excellent in balance of creep resistance in a wet state, applicability at a low temperature, adhesive property, initial adhesive force and odor reduction, the adhesive is particularly suitable for the production of the disposable product.

Since the disposable product of the present invention is prepared with the hot melt adhesive excellent in creep resistance in a wet state, urine leakage and the like does not occur, and further odor is also hardly generated.

The invention claimed is:

1. A hot melt adhesive comprising:
   (A) a styrene-isoprene block copolymer having a styrene content of 24-45%; and
   (B) an amorphous polyolefin wax modified with maleic acid and/or a maleic anhydride
   wherein the amorphous wax has no measurable fusion peak from a differential scanning calorimetry measurement; and wherein the amorphous wax is in an amount of from 1 to 15 parts by weight based on total weight of the styrene-isoprene block copolymer and the amorphous wax.

2. The hot melt adhesive according to claim 1, wherein the amorphous polyolefin wax modified with maleic acid and/or maleic anhydride comprises an amorphous ethylene/propylene copolymer wax.

3. The hot melt adhesive according to claim 1, wherein the adhesive has a melt viscosity not more than 5; 000 mPa·s at a temperature of 150° C.

4. The hot melt adhesive according to claim 1 consisting of the styrene-isoprene block copolymer, the amorphous wax, and, optionally, a tackifier resin, a plasticizer, or both.

5. The hot melt adhesive according to claim 4, wherein the tackifier resin is included in the hot melt adhesive and is in an amount of from 200 to 300 parts by weight based on the total weight of the styrene-isoprene block copolymer and the amorphous wax.

6. The hot melt adhesive according to claim 5, wherein the tackifier resin is in an amount of from 220 to 260 parts by weight based on the total weight of the styrene-isoprene block copolymer and the amorphous wax.

7. The hot melt adhesive according to claim 4, wherein the plasticizer is included in the hot melt adhesive and is in an amount of from 50 to 80 parts by weight based on the total weight of the styrene-isoprene block copolymer and the amorphous wax.

8. The hot melt adhesive according to claim 7, wherein the plasticizer is in an amount of from 60 to 75 parts by weight based on the total weight of the styrene-isoprene block copolymer and the amorphous wax.

9. The hot melt adhesive according to claim 1, wherein the amorphous wax is in an amount of from 2 to 7 parts by weight based on total weight of the styrene-isoprene block copolymer and the amorphous wax.

10. A disposable product comprising the hot melt adhesive according to claim 1.

11. A hot melt adhesive comprising:
   (A) a styrene-isoprene block copolymer having a styrene content of 24-45%;
   (B) an amorphous polyolefin wax modified with maleic acid and/or maleic anhydride;
   (C) a tackifier resin; and
   (D) a plasticizer;
   wherein the amorphous wax has no measurable fusion peak from a differential scanning calorimetry measurement;
   wherein the amorphous wax is in an amount of from 1 to 15 parts by weight based on total weight of the styrene-isoprene block copolymer and the amorphous wax;
   wherein the tackifier resin is in an amount of from 200 to 300 parts by weight based on the total weight of the styrene-isoprene block copolymer and the amorphous wax; and
   wherein the plasticizer is in an amount of from 50 to 80 parts by weight based on the total weight of the styrene-isoprene block copolymer and the amorphous wax.

12. The hot melt adhesive according to claim 11, wherein the amorphous wax is in an amount of from 2 to 7 parts by weight based on the total weight of the styrene-isoprene block copolymer and the amorphous wax.

13. The hot melt adhesive according to claim 11, wherein the tackifier resin is in an amount of from 220 to 260 parts by weight based on the total weight of the styrene-isoprene block copolymer and the amorphous wax.

14. The hot melt adhesive according to claim 11, wherein the plasticizer is in an amount of from 60 to 75 parts by weight based on the total weight of the styrene-isoprene block copolymer and the amorphous wax.

* * * * *

UNITED STATES PATENT AND TRADEMARK OFFICE
CERTIFICATE OF CORRECTION

PATENT NO. : 10,793,754 B2  
APPLICATION NO. : 15/675888  
DATED : October 6, 2020  
INVENTOR(S) : Masahiro Moriguchi Page 1 of 1

It is certified that error appears in the above-identified patent and that said Letters Patent is hereby corrected as shown below:

In the Claims

Column 17, Line 54: Claim 1: Change "acid and/or a maleic anhydribe" to --acid and/or maleic anhydride--.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*